(12) United States Patent  
Knuth (10) Patent No.: US 9,702,407 B2
(45) Date of Patent: Jul. 11, 2017

(54) ROLLER CIRCLE ASSEMBLY FOR HEAVY MACHINERY

(75) Inventor: Jason Knuth, Brookfield, WI (US)

(73) Assignee: Harnischfeger Technologies, Inc., Wilmington, DE (US)

( * ) Notice: Subject to any disclaimer, the term of this patent is extended or adjusted under 35 U.S.C. 154(b) by 1557 days.

(21) Appl. No.: 13/029,833

(22) Filed: Feb. 17, 2011

(65) Prior Publication Data

US 2012/0121215 A1    May 17, 2012

Related U.S. Application Data

(60) Provisional application No. 61/414,344, filed on Nov. 16, 2010.

(51) Int. Cl.
| F16C 33/36 | (2006.01) |
| B66C 3/02 | (2006.01) |
| B66C 23/26 | (2006.01) |
| B66D 1/26 | (2006.01) |
| E02F 3/48 | (2006.01) |

(Continued)

(52) U.S. Cl.
CPC ............. F16C 33/366 (2013.01); B66C 3/02 (2013.01); B66C 23/26 (2013.01); B66D 1/26 (2013.01); E02F 3/48 (2013.01); E02F 9/121 (2013.01); E02F 9/126 (2013.01); E21C 47/00 (2013.01); F16C 19/305 (2013.01);

(Continued)

(58) Field of Classification Search
CPC ...... F16C 19/305; F16C 19/364; F16C 19/34; F16C 19/36; F16C 19/225; F16C 19/383; F16C 19/30; F16C 33/366; F16C 33/526; F16C 33/36; F16C 2300/14; F16C 2350/26

USPC ....... 384/618, 619, 620, 622, 548, 564, 565, 384/571, 593

See application file for complete search history.

(56) References Cited

U.S. PATENT DOCUMENTS

| 1,057,861 A * | 4/1913 | Lockwood .................... 384/571 |
| 1,177,595 A * | 4/1916 | Bock ............................. 384/565 |

(Continued)

FOREIGN PATENT DOCUMENTS

| DE | 20306899 | 9/2004 |
| DE | 102009051858 | 5/2011 |

OTHER PUBLICATIONS

Second Office Action from the State Intellectual Property Office of China for Application No. 201110361876.5 dated Sep. 21, 2015 (18 pages).

(Continued)

*Primary Examiner* — Richard W Ridley
*Assistant Examiner* — Brian J McGovern
(74) *Attorney, Agent, or Firm* — Michael Best & Friedrich LLP (57) ABSTRACT

A roller circle assembly for heavy machinery includes an upper circular rail and a lower circular rail concentrically arranged about a central axis, and tapered rollers between the upper and lower rail. Each tapered roller includes a flange having an angled and convex flange contact surface that contacts the lower rail. The lower rail and/or the upper rail can include an angled surface configured for contact with the flange contact surface. The geometry of the rollers and the lower rail are configured to reduce the stresses applied to the rollers and lower rail due to contact between the flange contact surface and the angled surface.

18 Claims, 8 Drawing Sheets

(51) Int. Cl.
  *E02F 9/12* (2006.01)
  *E21C 47/00* (2006.01)
  *F16C 19/30* (2006.01)
  *F16C 33/52* (2006.01)
  *F16C 19/36* (2006.01)

(52) U.S. Cl.
  CPC .......... *F16C 33/526* (2013.01); *F16C 19/364* (2013.01); *F16C 2300/14* (2013.01)

(56) References Cited

U.S. PATENT DOCUMENTS

| | | | |
|---|---|---|---|
| 2,015,230 A * | 9/1935 | Lothrop | 384/571 |
| 3,985,406 A | 10/1976 | Baron | |
| 4,329,795 A | 5/1982 | Kalve | |
| 4,582,436 A | 4/1986 | Merron | |
| 4,723,852 A | 2/1988 | Ehret | |
| 5,205,657 A | 4/1993 | Feld | |
| 5,333,510 A | 8/1994 | Anderson et al. | |
| 5,676,471 A | 10/1997 | Kallenberger et al. | |
| 2006/0126983 A1 * | 6/2006 | Takemura et al. | 384/564 |

OTHER PUBLICATIONS

Third Office Action from the State Intellectual Property Office of China for Application No. 201110361876.5 dated Mar. 24, 2016 (21 pages).

First Office Action from the Australian Intellectual Property Office for Application 2015201337 dated Mar. 18, 2016 (5 pages).

* cited by examiner

FIG. 1

FIG. 4
SECTION A-A

FIG. 5
SECTION B-B

FIG. 13b

ROLLER CIRCLE ASSEMBLY FOR HEAVY MACHINERY

CROSS-REFERENCE TO RELATED APPLICATION

This application claims the benefit of and priority to U.S. Provisional Patent Application No. 61/414,344, filed Nov. 16, 2010, the entire contents of which are hereby incorporated by reference.

FIELD OF THE INVENTION

Roller and rail configurations for the roller circle assembly of heavy machinery, such as draglines, power shovels, and the like, as frequently used in mining operations and construction.

BACKGROUND

In heavy earth moving equipment, such as draglines or power shovels for mining, an upper structure is rotatably supported on a lower structure by a roller circle assembly. A boom typically extends from the upper structure, and a sheave is placed on the upper end of the boom. A hoist rope extends generally downwardly from the sheave to a bucket or dipper, depending on the application. In the dragline application, the bucket is also connected to the upper structure by a drag rope. Both the hoist rope and the drag rope can control the movement of the bucket. The lower structure of the dragline typically is mounted on treads or a walking tub mechanism for movement over the ground. The roller circle assembly may include an upper circular rail coupled to the upper structure, a lower circular rail coupled to the lower structure, and rollers positioned between the circular rails. The rails can be in segments. The rollers are typically tapered, having their larger diameter located radially outward.

Vertical loads applied to the tapered rollers of the roller circle assembly induce thrust loads that tend to urge the rollers radially outwardly. These loads vary depending on the operation being performed, and can increase dramatically during digging operations. To counteract these radial forces, some roller circle assemblies are provided with rollers having flanges on their inner ends, commonly referred to as flanged rollers. The flange may bear against the inside edge(s) of the lower and/or upper circular rail(s), which thereby resist the tendency of the roller to move radially outward. In certain known bearing assemblies, contact between the flange and the circular rail can result in highly concentrated point or line contact that develops very high stresses. Moreover, when overturning moments associated with loads applied to the bucket or dipper are combined with rotation of the upper structure relative to the lower structure, the rollers within the roller circle assembly may become misaligned. Under certain loading scenarios, edges of the flange may contact the upper surface of the lower rail, or the lower surface of the upper rail. Such misalignment and undesired contact between the rollers and the rails can further exacerbate the point or line loading and result in additional significant stresses on the associated components. As a result, the contact surfaces, of the roller circle components, particularly the contact surfaces on the rail, may deteriorate due to spalling or chipping, which can eventually lead to failure of the roller circle assembly.

Roller circle assemblies in heavy earth moving equipment can measure from three meters to more than 20 meters in diameter. Very heavy loads, amounting to several hundred metric tons, may be transmitted through the bearing assemblies to the lower structure, and the overturning moments created by loads on the boom can create highly concentrated stresses on small segments of the bearing assembly. Moreover, the loading along a given arc length of the roller circle can be non-uniform during operations such as digging, dumping, transferring, and so forth. Under dynamic non-uniform loading, the rollers of the roller circle assemblies may twist or distort relative to the rails, further concentrating the load on a small contact area and bringing about costly failures.

SUMMARY

In some embodiments, a heavy earth-moving machine includes a lower structure, an upper structure supported by the lower structure and rotatable with respect thereto, a substantially circular lower rail mounted on the lower structure, a substantially circular upper rail mounted on the upper structure, and a plurality of tapered rollers engaging and positioned between the upper rail and the lower rail. Each of the plurality of tapered rollers includes a substantially frustoconical body portion having an enlarged end, a reduced end, and a roller surface extending between the enlarged end and the reduced end. The body portion defines a roller axis. Each of the plurality of tapered rollers also includes a flange portion that extends radially from the reduced end of the body portion and that includes a convex flange contact surface facing toward the enlarged end.

In other embodiments, a tapered roller for a roller circle assembly for heavy machinery includes a substantially frustoconical body portion having an enlarged end, a reduced end, and a roller surface extending between the enlarged end and the reduced end. The body portion defines a roller axis. The tapered roller also includes a flange portion that extends radially from the reduced end of the body portion and that includes a convex flange contact surface facing toward the enlarged end.

In still other embodiments, a roller circle assembly for heavy machinery rotatably supports an upper structure of the heavy machinery above a lower structure of the heavy machinery. The roller circle assembly includes a tapered roller including a substantially frustoconical body portion having an enlarged end, a reduced end, and a roller surface extending between the enlarged end and the reduced end. The body portion defines a roller axis. The tapered roller also includes a flange portion that extends radially from the reduced end of the body portion and that includes a convex flange contact surface facing toward the enlarged end. The roller circle assembly also includes a lower rail. The lower rail includes an upper surface along which the roller surface rolls and an inner rail surface. The lower rail includes a transition between the inner rail surface and the upper surface. The transition includes an angled portion that is contacted by the flange contact surface.

The drawings identified above are not necessarily to scale. It should be understood that the invention is not limited in its application to the details of construction and the arrangements of the components set forth in the following description or illustrated in the above-described drawings. The invention is capable of other embodiments and of being practiced or being carried out in various ways. Also, it is to be understood that the phraseology and terminology used herein is for the purpose of description and should not be regarded as limiting.

DETAILED DESCRIPTION

Figure 1:
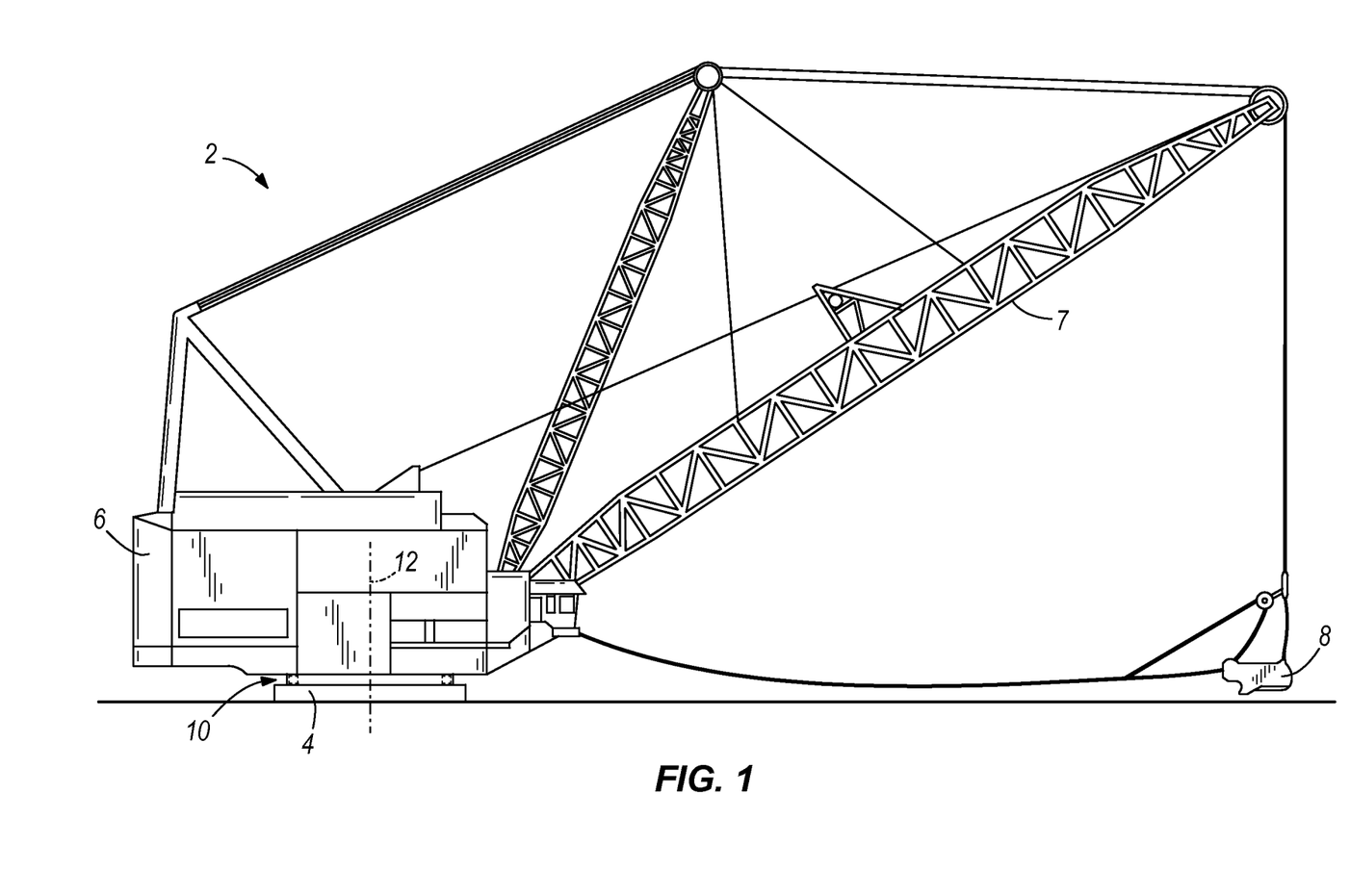
FIG. 1 is an elevational view of a dragline including a roller circle assembly.
Figure 2:
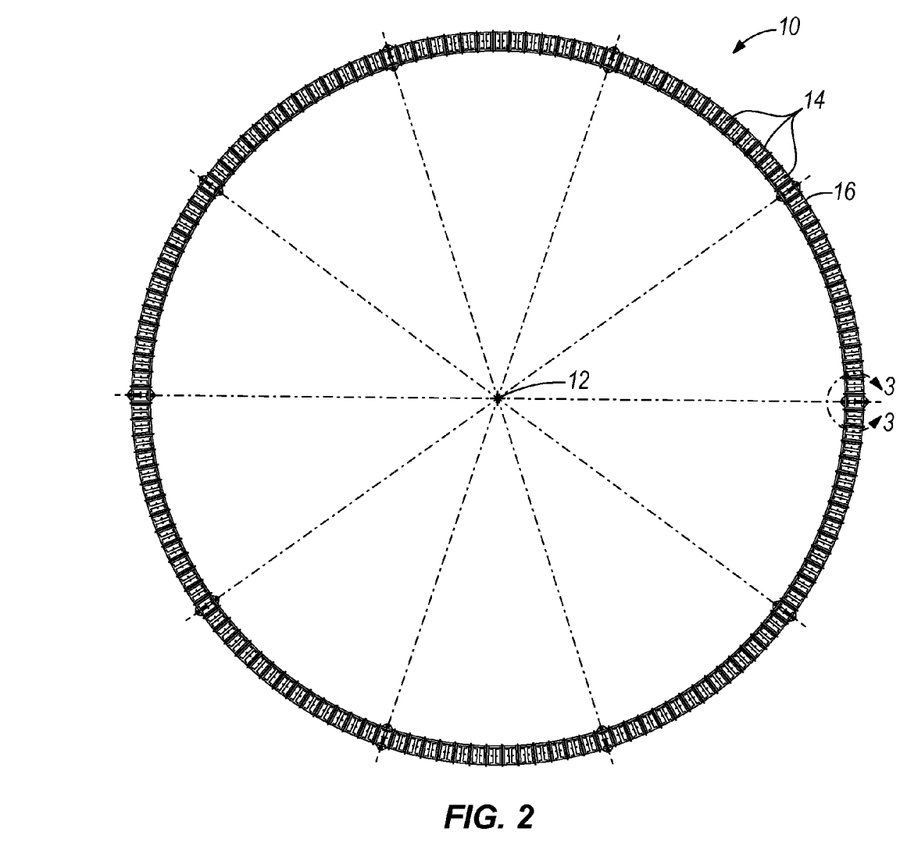
FIG. 2 is a top view of the roller circle assembly from the dragline of FIG. 1.
Figure 3:
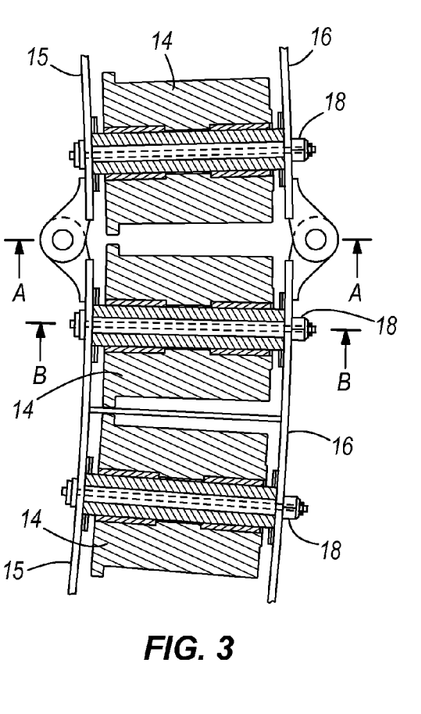
FIG. 3 is an enlarged cross-sectional view of a portion of the roller circle assembly of FIG. 2.
Figure 4:
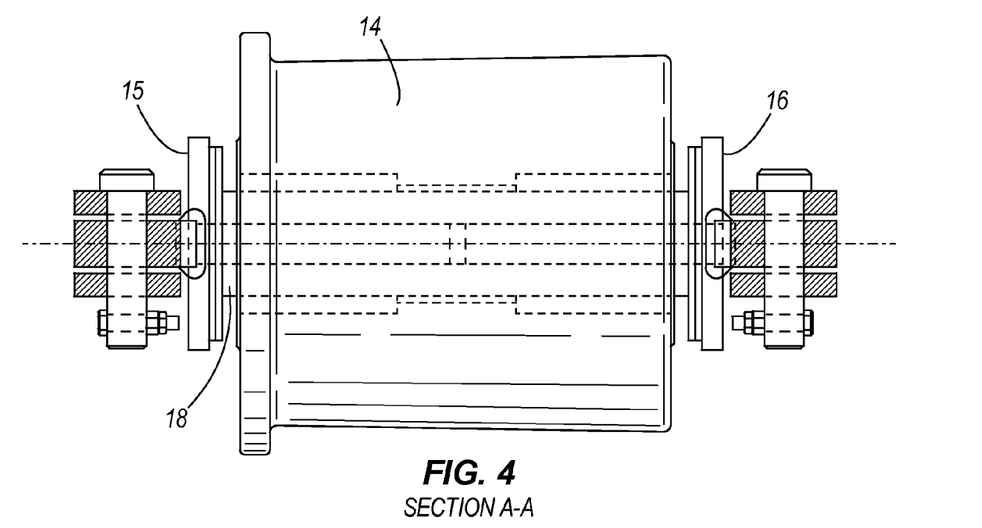
FIG. 4 is a partial section view taken along line A-A of FIG. 3.

FIG. 1 illustrates a dragline 2 including a lower structure, frame, tub, or base 4, which may be in the form of a treaded drive-mechanism or walking tub, and an upper structure, frame or cab 6 rotatably supported above the base 4. A boom 7 extends from the cab 6 and supports a bucket 8. In combination with the boom 7, a series of sheaves, guides, and wires are used to maneuver the bucket 8 along the ground for excavating and mining operations. A roller circle assembly 10 is coupled between the base 4 and the cab 6 and rotatably supports the cab 6 for rotation about a central axis 12. Rotation of the cab 6 relative to the base 4 is also utilized to maneuver the boom 7 and the bucket 8 during excavating and mining operations. Although the foregoing description refers specifically to a dragline, it should be appreciated that the roller circle assembly 10 discussed further herein may be used in other applications such as power shovels, cranes, and the like where an upper structure or cab 6 rotates relative to a lower structure or base 4.

With reference also to FIGS. 2-5 and 6a, the roller circle assembly 10 includes a plurality of tapered rollers 14 coupled together by an assembly of inner roller bands 15, outer roller bands 16, and bushing and pin assemblies 18 that rotatably couple the rollers 14 to the inner and outer roller bands 15, 16. As further shown in FIG. 6a, the rollers 14 are positioned between a lower rail portion 20 and an upper rail portion 22. The lower rail portion 20 is coupled to the base 4 and the upper rail portion 22 is coupled to the cab 6. When the cab 6 rotates relative to the base 4, the upper rail rotates with the cab 6 about the central axis 12, thereby causing the rollers 14 to roll along the upper surface 24 of the lower rail portion 20 and the lower surface 26 of the upper rail portion 22. Some constructions of the upper rail portion 22 include lubrication channels 28 that allow lubricant to be supplied to the lower surface 26 of the upper rail portion 22 (see FIG. 6a).

Figure 5:
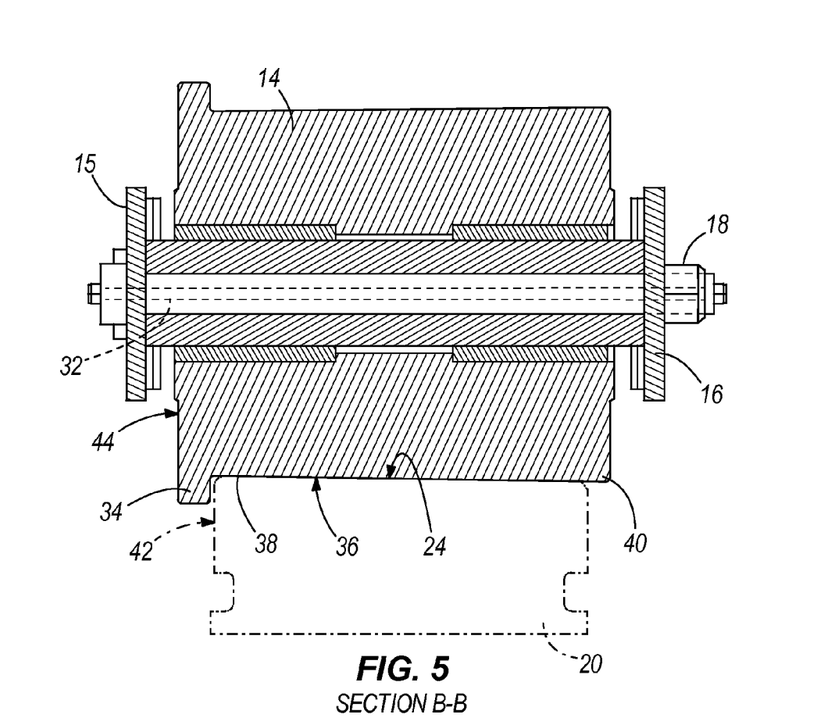
FIG. 5 is a partial section view taken along line B-B of FIG. 3, and showing in section a roller of the roller circle assembly of FIG. 2.
Figure 6A:
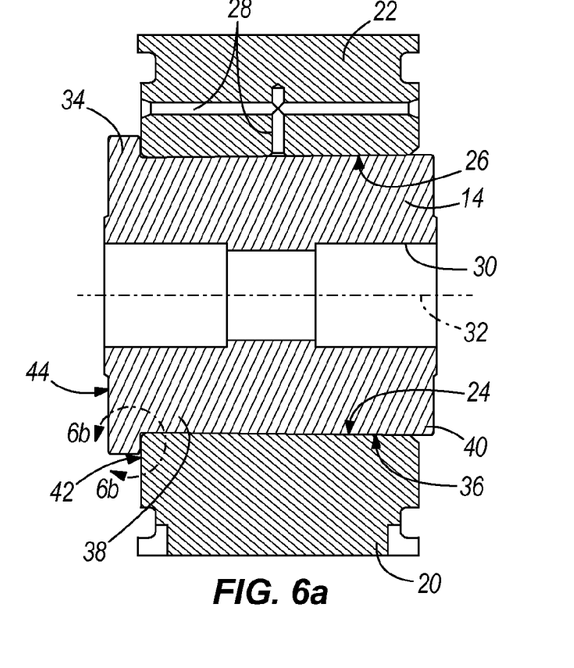
FIG. 6a is a section view similar to FIG. 5 illustrating the roller in alignment with a lower rail portion and an upper rail portion of the roller circle assembly.

Referring to FIGS. 5 and 6a, each roller 14 defines a central bore 30 for receiving the bushing and pin assembly 18 that couples the roller 14 to the inner and outer roller bands 15-16. The central bore 30 in turn defines a roller axis 32 about which the roller 14 rotates when the upper rail portion 22 rotates about the central axis 12 (see FIG. 1) relative to the lower rail portion 20. Each roller 14 includes a flange 34 extending radially outwardly (with respect to the roller axis 32) from the inner end (with respect to the central axis 12) of the roller 14. The rollers 14 also are tapered and define a generally frustoconical rolling surface 36 having a reduced diameter portion 38 adjacent the flange 34 and an enlarged diameter portion 40 at an outer end (with respect to the central axis 12) of the roller 14.

Figure 6B:
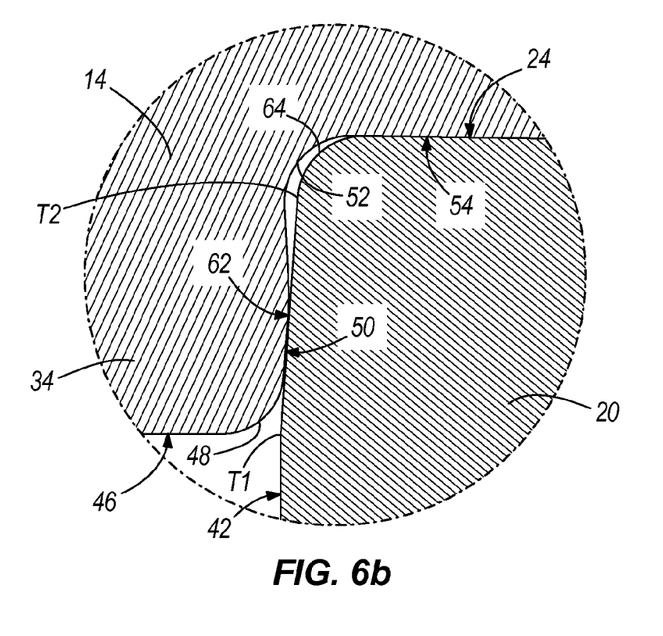
FIG. 6b is an enlarged section view of the encircled portion of FIG. 6a showing engagement between the roller and lower rail portion when the roller is in alignment with the lower rail portion.

The upper surface 24 of the lower rail portion 20 and the lower surface 26 of the upper rail portion 22 are each set at an angle that generally corresponds to the angle of the frustoconical rolling surface 36. As a result, axially-directed loads applied to the upper rail portion 22 from the upper structure 6 tend to urge the roller 14 radially outwardly (e.g., to the right in FIGS. 5 and 6a). As shown in FIG. 6b, if the roller 14 moves sufficiently outwardly due to loading, the flange 34 will contact the lower rail portion 20. Specifically, the flange will contact an angled portion 62 of an inner rail surface 42, thereby restricting further radially outward movement of the roller 14. Under dynamic non-uniform loading, the rollers 14 may twist or distort, which can reduce the contact area between the roller 14 and the lower and/or upper rail portions 20, 22, thereby undesirably increasing contact stresses between the components. As discussed below, the flange 34, the rolling surface 36, and the inner rail surface 42 are configured to reduce the stresses encountered by the roller 14 and the lower rail portion 20 when the flange 34 contacts the inner rail surface 42.

Figure 7:
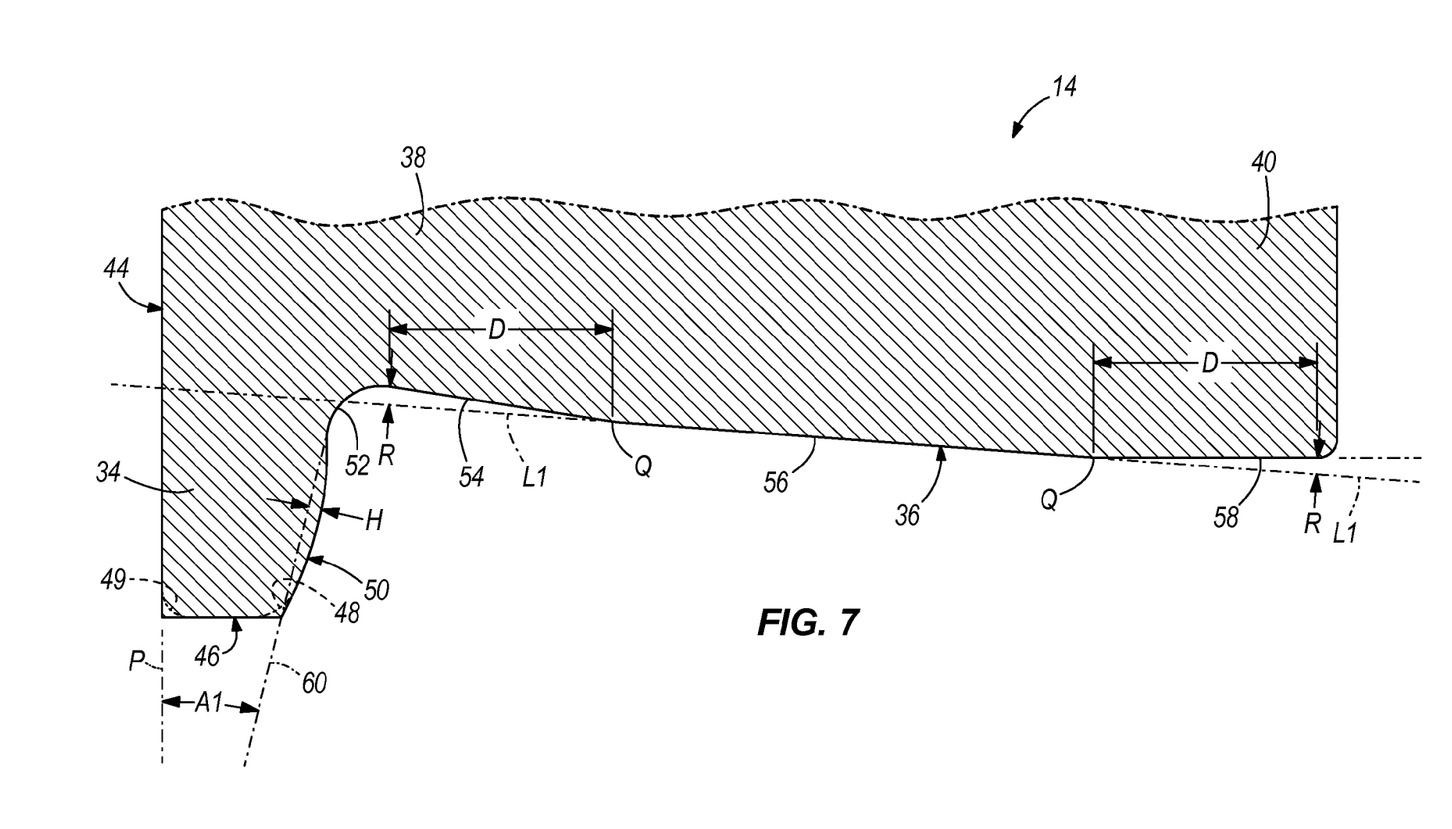
FIG. 7 is an enlarged section view of a flange and rolling surface area of the roller of FIG. 5.

FIG. 7 is a detailed view of the flange 34 and the rolling surface 36 area of the roller 14. For the following description of the geometry of the roller 14, the terms "radially," "circumferentially," and "axially" are with respect to the roller axis 32 illustrated in FIG. 6a. The roller 14 includes a generally flat, axially-facing inner end surface 44 that faces toward the central axis 12 (see FIG. 1). The flange 34 defines a generally cylindrical outer surface 46 that meets the annular end surface 44 at a substantially right angle. In some embodiments, the cylindrical outer surface 46 is blended into the annular end surface 44 by providing a radius 49 (shown in phantom in FIG. 7) between the cylindrical outer surface 46 and the annular end surface 44. The cylindrical outer surface 46 defines a radially outer edge of an angled, crowned, and convex flange contact surface 50. In some embodiments, the cylindrical outer surface 46 is blended into the convex flange contact surface 50 by providing a radius 48 (shown in phantom in FIG. 7) between the cylindrical outer surface 46 and the flange contact surface 50. The flange contact surface 50 transitions via an inner radius 52 to the rolling surface 36, which includes an inner edge relief portion 54, a central portion 56, and an outer edge relief portion 58.

When viewed in section as in FIG. 7, the flange contact surface 50 defines an arc or curve that extends from the inner radius 52 to the cylindrical outer surface 46. A chord line 60 may be drawn from the inner end of the arc to the outer end of the arc, which, when the radius 48 is present, is defined by a point at which the arc intersects an extension of the cylindrical outer surface 46. The chord line 60 defines an angle A1 with respect to a reference plane P that is perpendicular to the roller axis 32 (for drawing clarity, the reference plane P is shown co-planar with the inner end surface 44; it should be appreciated, however, that the inner end surface 44 may not be perpendicular to the roller axis 32 in all embodiments). In some embodiments, the angle A1 is between about 1 degree and about 5 degrees. In other embodiments, the angle A1 is between about 1.5 degrees and about 4.25 degrees. In still other embodiments, the angle A1 is between about 2 degrees and about 3.5 degrees. Generally, roller circle assemblies with a larger diameter are associated with relatively smaller values of the angle A1, while roller circle assemblies with a smaller diameter are associated with relatively larger values of the angle A1. The crowning of the flange contact surface 50 also provides a crown height H, defined as the maximum distance between the flange contact surface 50 and the chord line 60. In some embodiments, the crown height H is between about 0.010 inch and about 0.040 inch. In other embodiments, the crown height H is between about 0.020 inch and about 0.030 inch. Depending on the specific geometry selected, the maximum crown height H may occur at different locations along flange contact surface.

The rolling surface 36, although generally frustoconical, also is somewhat convex and includes the inner and outer edge relief portions 54, 58. Moving axially from left to right in FIG. 7, the diameter of the central portion 56 increases at a substantially constant rate. As shown, the inner and outer edge relief portions 54, 58 each diverges axially inwardly and away from a tangent line L1 extended from the central portion 56. Each edge relief portion 54, 58 includes a length D in the axial direction, and a relief value R defined as the maximum distance between the edge relief portion 54, 58 and the tangent line L1. In some embodiments, the length D is between about 150 and about 400 times the relief value R. In other embodiments, the length D is between about 200 and 300 times the relief value R. In still other embodiments, the length D is about 250 times the relief value R. It should be appreciated that the values of D and R, and the relative values of D and R, are not necessarily the same for both the inner and outer edge relief portions 54, 58. Preferably, transition points Q between the central portion 56 and the inner and outer edge relief portions 54, 58 of the rolling surface 36 are smoothed over to remove any sharp edges that might increase the stresses applied to the roller 14 or to the lower or upper rail portions 20, 22 (see FIG. 6*a*).

Figure 8:
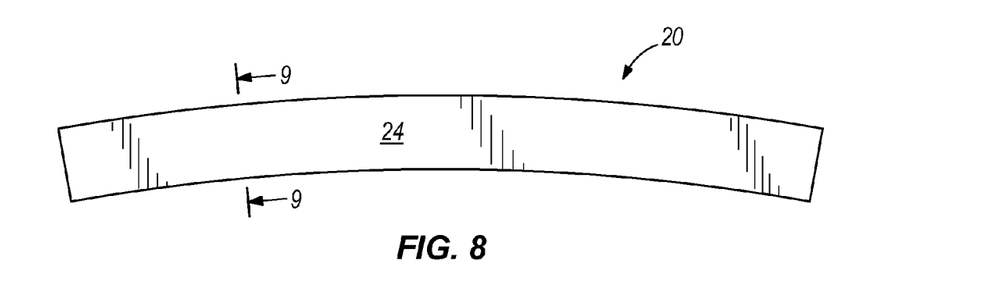
FIG. 8 is a top view of a lower rail portion of the roller circle assembly of FIG. 2.
Figure 9:
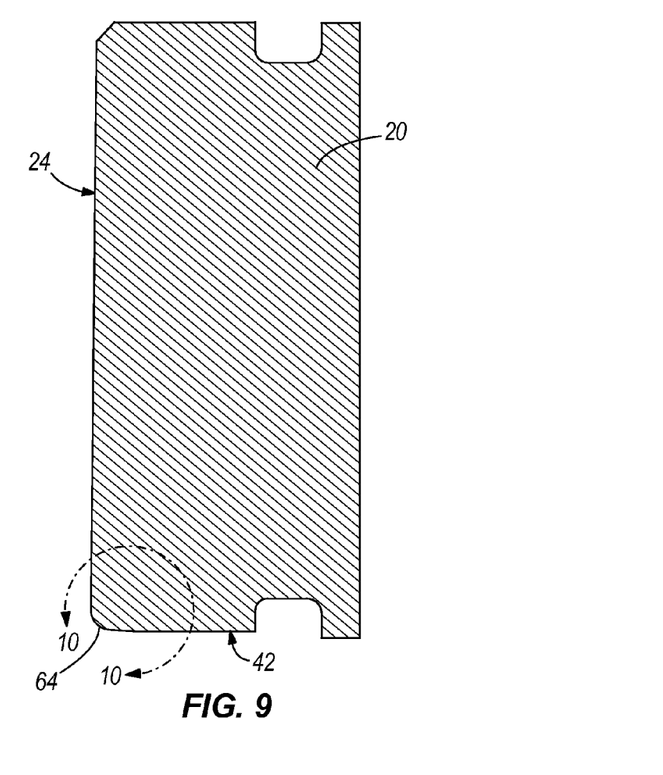
FIG. 9 is a section view taken along line B-B of FIG. 8.
Figure 10:
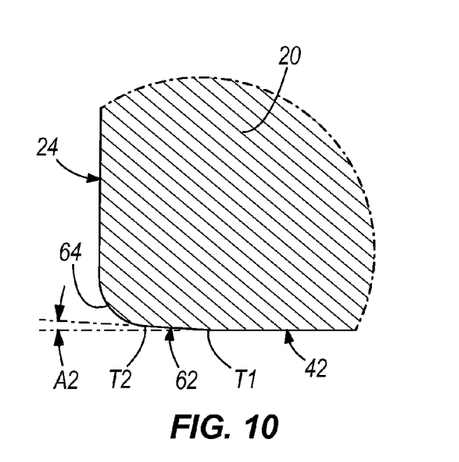
FIG. 10 is an enlarged section view showing the encircled portion of FIG. 9.
Figure 11:
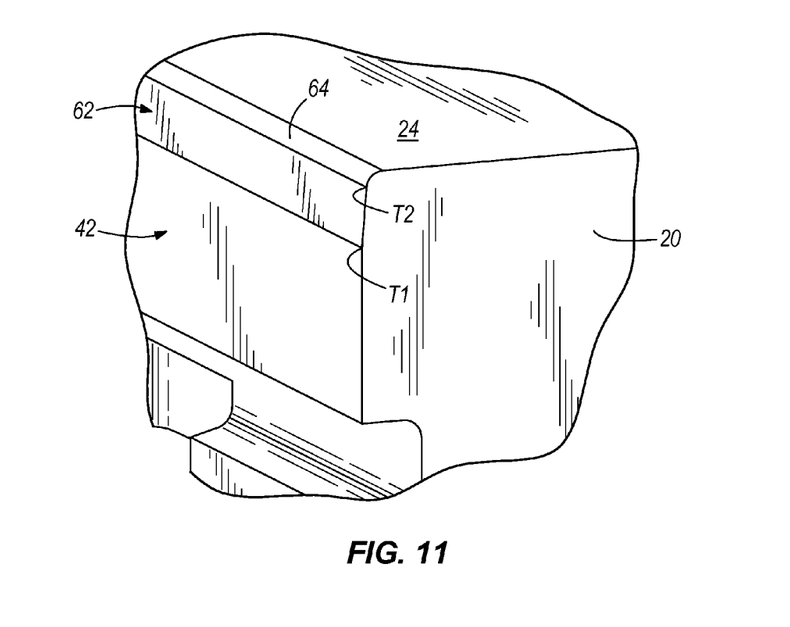
FIG. 11 is a perspective view of the lower rail portion of FIG. 8.

Referring to FIGS. 8-11, the lower rail portion 20 includes features that cooperate with the flange contact surface 50 (see FIG. 6*b*) to reduce stresses in the roller 14 and the lower rail portion 20. Although only the lower rail portion 20 is discussed herein, it should be appreciated that the features of the lower rail portion 20 that cooperate with the flange contact surface 50 may also be provided on the upper rail portion 22. As shown in FIG. 8, each lower rail portion 20 is substantially arcuate, having a curvature that corresponds to the diameter of the roller circle assembly 10. As shown in FIGS. 6*b* and 9-11, the transition between the inner rail surface 42 and the upper surface 24 of the lower rail portion 20 includes a substantially flat (when viewed in section), angled portion 62 and a rail radius 64. As shown in FIG. 10, the angled portion 62 defines an angle A2 and a first transition point T1 relative to the remainder of the inner rail surface 42. The angled portion 62 also defines a second transition point T2 between the angled portion 62 and the rail radius 64. In some embodiments, the angle A2 is between about 2 degrees and about 5 degrees, in other embodiments, the angle A2 is between about 3.5 degrees and about 4.25 degrees. In still other embodiments, the angle A2 is about 4 degrees. The angle A2 is not necessarily the same as the angle A1. In some embodiments, the rail radius 64 is about 0.25 inch. In other embodiments, the rail radius 64 is up to 0.50 inch.

Figure 12:
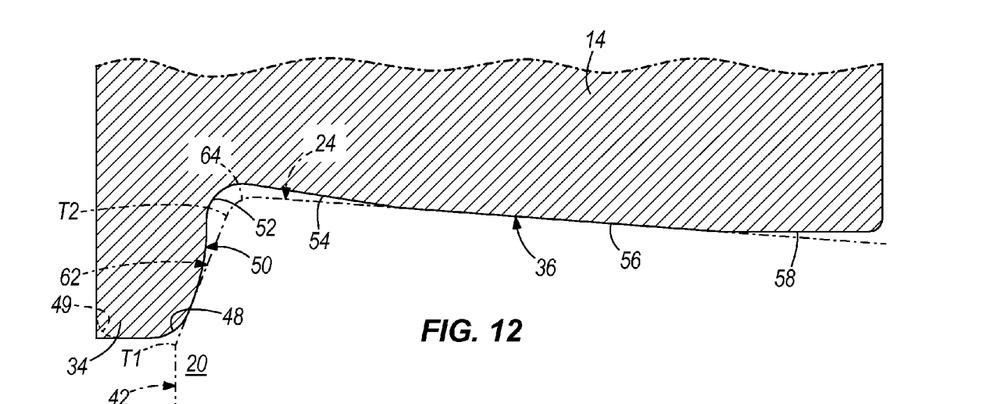
FIG. 12 is an enlarged section view similar to FIG. 7 but also illustrating the lower rail portion of FIG. 8.

FIGS. 6*b* and 12 illustrate the flange 34 of the roller 14 contacting the angled portion 62 of the inner rail surface 42 of the lower rail portion 20. As shown, the flange contact surface 50 contacts the angled portion 62 at a location between the first transition point T1 and the second transition point T2. When the roller 14 is properly aligned with the lower rail portion 20, the flange contact surface 50 contacts the angled portion approximately ⅓ of the way up the angled portion 62 from the transition point T1. The combination of the convex flange contact surface 50 and the angled portion 62 produce a relatively large, elliptical contact area that distributes stresses in a relatively uniform manner. Moreover, as the components wear through continued use, the angled portion 62 tends to develop a very slight concavity that can further enlarge the contact area, which in turn further reduces the stresses on the components.

Figure 13A:
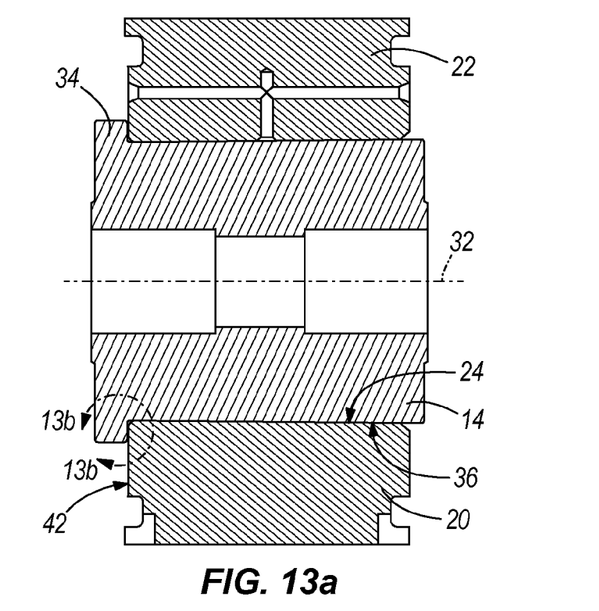
FIG. 13a is a section view similar to FIG. 6a but illustrating the roller in a misaligned position relative to the lower rail portion and the upper rail portion of the roller circle assembly.
Figure 13B:
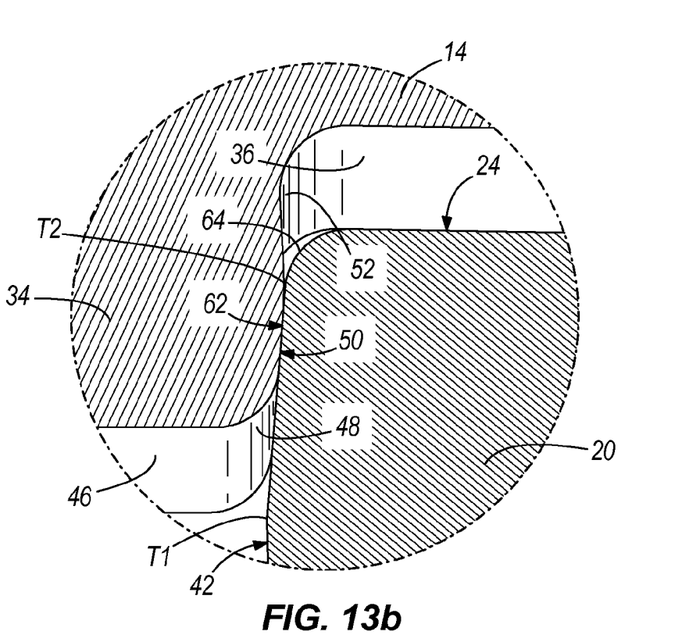
FIG. 13b is an enlarged section view of the encircled portion of FIG. 13a showing engagement between the roller and lower rail portion when the roller is in alignment with the lower rail portion.

Referring to FIGS. 13*a* and 13*b*, certain loading scenarios experienced by the dragline 2 can result in misalignment between the roller 14 and the lower and upper rail portions 20, 22. When subjected to such misalignment, the contact area between the flange contact surface 50 and the angled portion 62 moves upwardly, toward the second transition point T2, such that the contact is distributed over approximately the upper half of the angled portion 62. The combination of the crowned and angled flange contact surface 50, the angled portion 62, the inner edge relief portion 54, and the relative radii of the inner radius 52 and the rail radius 64 generally ensures that all contact between the flange 34 and the lower rail portion 20 occurs with the flange contact surface 50 contacting the angled portion 62 between the first transition point T1 and the second transition point T2, thereby reducing stresses in the flange 34 and the lower rail portion 20.

Although different combinations of the above-described geometry may be incorporated into a given roller circle assembly depending upon, among other things, the diameter of the roller circle assembly, the diameters and lengths of the rollers, the taper of the rollers, and the particular load scenario, one specific embodiment of a roller circle assembly 10 incorporates a roller flange 34 having an angle A1 of about 2 degrees, a crown height H of about 0.030 inch, and an edge relief length D that is about 250 times the relief value R, and a lower rail portion 20 having an angle A2 of about 4 degrees and a radius 64 of about 0.25 inch.

What is claimed is:
1. A heavy earth-moving machine comprising:
a lower structure;
an upper structure supported by the lower structure and rotatable with respect thereto;
a substantially circular lower rail mounted on the lower structure;
a substantially circular upper rail mounted on the upper structure; and
a plurality of tapered rollers engaging and positioned between the upper rail and the lower rail, each of the plurality of tapered rollers including a substantially frustoconical body portion having an enlarged end, a reduced end, and a roller surface extending between the enlarged end and the reduced end, the body portion defining a roller axis; and a flange portion extending radially from the reduced end of the body portion and including a convex flange contact surface facing toward the enlarged end, wherein the flange contact surface defines a concave radiused edge recessed relative to the lower rail.

2. The heavy earth-moving machine of claim 1, wherein the roller surface includes a central portion and an inner edge relief portion extending from the central portion toward the flange, and wherein the inner edge relief portion diverges axially inwardly and away from a tangent line extended from the central portion toward the flange portion.

3. The heavy earth-moving machine of claim 1, wherein the lower rail includes an inner rail surface, an upper surface that engages the roller surfaces of each of the plurality of rollers, and a transition portion between the inner rail surface and the upper surface, and wherein the flange contact surface of each of the plurality of rollers is engageable with the transition portion to substantially maintain alignment of the plurality of rollers with respect to the lower rail in response to loads applied to the upper structure.

4. The heavy earth-moving machine of claim 3, wherein the transition portion includes a substantially flat portion that is angled with respect to the inner rail surface, and a rail radius portion extending between the substantially flat portion and the upper surface.

5. The heavy earth-moving machine of claim 4, wherein an angle between the substantially flat portion and the inner rail surface is between 2 degrees and 5degrees.

6. The heavy earth-moving machine of claim 4, wherein the flange contact surface defines a curve lying in a section plane that is coplanar with the roller axis, and wherein a chord line drawn between radially inner and radially outer ends of the curve defines a first angle with respect to a reference plane that is normal to the roller axis and substantially aligned with a roller end surface proximate the reduced end, and wherein a second angle between the substantially flat portion and the inner rail surface differs from the first angle.

7. A tapered roller for a roller circle assembly for heavy machinery, the roller circle assembly rotatably supporting an upper structure of the heavy machinery above a lower structure of the heavy machinery, the tapered roller comprising:

a substantially frustoconical body portion having an enlarged end, a reduced end, and a roller surface extending between the enlarged end and the reduced end, the body portion defining a roller axis; and a flange portion extending radially from the reduced end of the body portion and including a convex flange contact surface facing toward the enlarged end, wherein the flange contact surface defines a concave radiused edge recessed in a direction from the enlarged end toward the reduced end.

8. The tapered roller of claim 7, wherein the roller surface includes a central portion and an inner edge relief portion extending from the central portion toward the flange, and wherein the inner edge relief portion diverges axially inwardly and away from a tangent line extended from the central portion toward the flange portion.

9. The tapered roller of claim 8, wherein the convex flange contact surface transitions into the inner edge relief portion via an inner radius.

10. The tapered roller of claim 7, wherein the flange contact surface defines a curve that lies in a section plane that is coplanar with the roller axis, and wherein a chord line drawn between radially inner and radially outer ends of the curve defines an acute angle with respect to a reference plane that is perpendicular to the axis and substantially aligned with a roller end surface proximate the reduced end.

11. The tapered roller of claim 10, wherein the acute angle is between 1 degree and 5 degrees.

12. A roller circle assembly for heavy machinery, the roller circle assembly rotatably supporting an upper structure of the heavy machinery above a lower structure of the heavy machinery, the roller circle assembly comprising:

a tapered roller including a substantially frustoconical body portion having an enlarged end, a reduced end, and a roller surface extending between the enlarged end and the reduced end, the body portion defining a roller axis, the tapered roller also including a flange portion extending radially from the reduced end of the body portion and including a convex flange contact surface facing toward the enlarged end, wherein the flange contact surface defines a concave radiused edge recessed in a direction from the enlarged end toward the reduced end; and a lower rail having an upper surface along which the roller surface rolls and an inner rail surface, the lower rail including a transition between the inner rail surface and the upper surface, the transition including an angled portion that is contacted by the flange contact surface.

13. The roller circle assembly of claim 12, wherein the transition further defines a rail radius portion extending from the angled portion toward the upper surface, and wherein the flange contact surface contacts the angled portion below the rail radius portion.

14. The roller circle assembly of claim 12, wherein the flange contact surface defines a curve lying in a section plane that is coplanar with the roller axis, and wherein a chord line drawn between radially inner and radially outer ends of the curve defines an acute angle with respect to a reference plane that is normal to the roller axis and substantially aligned with a roller end surface proximate the reduced end.

15. The roller circle assembly of claim 14, wherein the acute angle is between 1 degree and 5 degrees.

16. The roller circle assembly of claim 14, wherein an angle between the angled portion and the inner rail surface differs from the acute angle.

17. The roller circle of claim 16, wherein the angle between the angled portion and the inner rail surface is between 2 degrees and 5 degrees.

18. The roller circle of claim 16, wherein the angle between the angled portion and the inner rail surface is greater than the acute angle.

* * * * *